(12) United States Patent
Benzakour et al.

(10) Patent No.: US 10,956,368 B2
(45) Date of Patent: Mar. 23, 2021

(54) DEVICE AND METHOD FOR COMPARING GEOMETRIC FILES

(71) Applicant: XYALIS, Grenoble (FR)

(72) Inventors: Farid Benzakour, Sassenage (FR); Philippe Morey-Chaisemartin, Chamonix-Mont-Blanc (FR); Frederic Brault, Sainte-Agnes (FR); Eric Beisser, Vaulnaveys-le-Haut (FR)

(73) Assignee: Xyalis, Grenoble (FR)

( * ) Notice: Subject to any disclaimer, the term of this patent is extended or adjusted under 35 U.S.C. 154(b) by 0 days.

(21) Appl. No.: 16/961,375

(22) PCT Filed: Jan. 16, 2019

(86) PCT No.: PCT/FR2019/050090
§ 371 (c)(1),
(2) Date: Jul. 10, 2020

(87) PCT Pub. No.: WO2019/141942
PCT Pub. Date: Jul. 25, 2019

(65) Prior Publication Data
US 2020/0364911 A1 Nov. 19, 2020

(30) Foreign Application Priority Data

Jan. 17, 2018 (FR) ...................................... 1850383

(51) Int. Cl.
*G06F 16/14* (2019.01)
*G06T 7/11* (2017.01)
*G06K 9/62* (2006.01)
*H04L 9/06* (2006.01)
*H04L 9/32* (2006.01)

(52) U.S. Cl.
CPC .......... *G06F 16/152* (2019.01); *G06K 9/6215* (2013.01); *G06T 7/11* (2017.01); *H04L 9/0643* (2013.01); *H04L 9/3247* (2013.01); *G06T 2207/20021* (2013.01); *G06T 2210/12* (2013.01)

(58) Field of Classification Search
CPC .... G06F 30/398; G06F 30/33; G06F 30/3323; G06F 30/367; G06F 30/39; G06F 16/152; G06F 16/14; G04L 3/3247; H04L 9/0643; H04L 9/3247; H04L 9/06; H04L 9/32; G06T 7/11; G06T 2207/20021; G06T 2210/12; G06K 9/62; G06K 9/6215
See application file for complete search history.

(56) References Cited

U.S. PATENT DOCUMENTS 7,801,325 B1 9/2010 Hetzel et al.
2006/0030164 A1* 2/2006 Im ....................... H01L 27/1285
438/795

(Continued)

OTHER PUBLICATIONS

Fernandes et al., "Geometric soft hash functions for 2D and 3D objects," Security, Steganography and Watermarking of Multimedia Contents VI, SPIE-IS&T Electronic Imaging, SPIE vol. 5306, 2004,m pp. 784-795.

*Primary Examiner* — Vuthe Siek
(74) *Attorney, Agent, or Firm* — The Noblitt Group, PLLC

(57) ABSTRACT

The invention concerns a method of generating a digital signature of a geometric design represented by a geometric design file, the method involving generating, by a data processing device, the digital signature based on a single axis projection of the geometric design.

12 Claims, 5 Drawing Sheets

(56) References Cited

U.S. PATENT DOCUMENTS

2015/0106775 A1* 4/2015 Krasnicki ............ G06F 30/367
   716/107
2017/0024585 A1* 1/2017 Mooij .................... G06F 21/72

* cited by examiner

DEVICE AND METHOD FOR COMPARING GEOMETRIC FILES

The present application claims priority from French patent application FR18/50383, the contents of which is hereby incorporated by reference.

FIELD

The present disclosure relates to the field of systems for document comparison, and in particular to a device and method for comparing geometric design files.

BACKGROUND

Geometric designs may be created and used in various fields, including construction, product design and microelectronics. Such designs may be defined by geometric design files, which represent features of the designs in the form of vectorial descriptions, polygons, Bézier curves, etc. For example, in the field of microelectronics, circuit layouts are often represented by a file in the GDS II (Graphic Database System II) file format or in the OASIS (Open Artwork System Interchange Standard) file format.

In some situations it may be desirable to automatically compare two geometric designs in order to detect any differences between the designs. For example, a geometric design file defining a geometric design may be edited by several parties, and one of the parties may wish to verify whether any substantive changes have been made to the design. However, a difficulty is that it is not sufficient to simply perform a comparison of the two geometric design files defining the design. Indeed, there are various types of file modifications, such as modification of the file type, of the order in which the design elements are defined, of the manner in which the design elements are defined, as well as modifications to the date of the file, that do not constitute substantive design changes, and thus should not be identified as such. However, there is a technical difficulty in providing a solution for detecting substantive differences between two geometric designs in a simple and rapid manner.

SUMMARY

It is an aim of embodiments of the present description to at least partially address one or more difficulties in the prior art.

According to one aspect, there is provided a method of generating a digital signature of a geometric design represented by a geometric design file, the method comprising generating, by a data processing device, the digital signature based on a single axis projection of the geometric design.

According to one embodiment, generating the digital signature comprises performing, by the data processing device, the single axis projection to generate a vector comprising single axis coordinates of selected points in the geometric design.

According to one embodiment, generating the digital signature further comprises applying, by the data processing device, a HASH function to said vector in order to reduce its length.

According to a further aspect, there is provided a method of detecting, by a data processing device, differences between a first geometric design defined by a first geometric design file and a second geometric design defined by a second geometric design file, the method comprising: generating, for at least the first geometric design file, a first digital signature according to the above method; and comparing the first digital signature with a second digital signature associated with the second geometric design file.

According to one embodiment, the method further comprises, prior to the comparing step: generating, for the second geometric design file, the second digital signature based on a single axis project of the second geometric design.

According to one embodiment, the method further comprises, prior to the comparing step: extracting, by the data processing device, the second digital signature from the second geometric design file.

According to one embodiment, generating the first digital signature comprises: dividing, by the data processing device, the first geometric design into a plurality of windows; generating a first sub-signature for each of the windows, each first sub-signature being generated based on a single axis projection of the portion of the geometric design contained within the corresponding window; and combining the first sub-signatures of the windows to generate the first digital signature.

According to one embodiment, the method further comprises: generating, or extracting from the first geometric design file, a first boundary box associated with the first geometric design; comparing the first boundary box with a second boundary box associated with the second geometric design; and detecting a difference between the first and second geometric design files by detecting a difference between the first and second boundary boxes.

According to one embodiment, generating the first digital signature comprises: identifying, by the data processing device, a hierarchy of common design elements each having one or more instantiations within the first geometric design file; generating an elemental signature for each common design element identified in the first geometric design file; and generating the first digital signature based on each of the elemental signatures and on one or more characteristics of the instantiation of each of the common design elements in the first geometric design file.

According to a further aspect, there is provided a non-transitory electronic storage medium storing a computer program comprising instructions for executing the above method when executed by the data processing device.

According to a further aspect, there is provided a computing device comprising: a memory storing a first geometric design file defining a first geometric design; and a data processing device configured to: generate a first digital signature for the first design file by performing a single axis projection of the first geometric design; and store the first digital signature to a memory.

According to one embodiment, the data processing device is further configured to detect differences between the first geometric design and a second geometric design defined by a second geometric design file by comparing the first digital signature with a second digital signature associated with the second geometric design file, and to display on a display device an indication of the detected difference.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

While throughout the following description embodiments are described in relation with a geometric design corresponding to a layer of a microelectronic device, it will be apparent to those skilled in the art that the principles described herein could be applied to a broad range of file types used in other fields such as construction, product development, etc.

Figure 1:
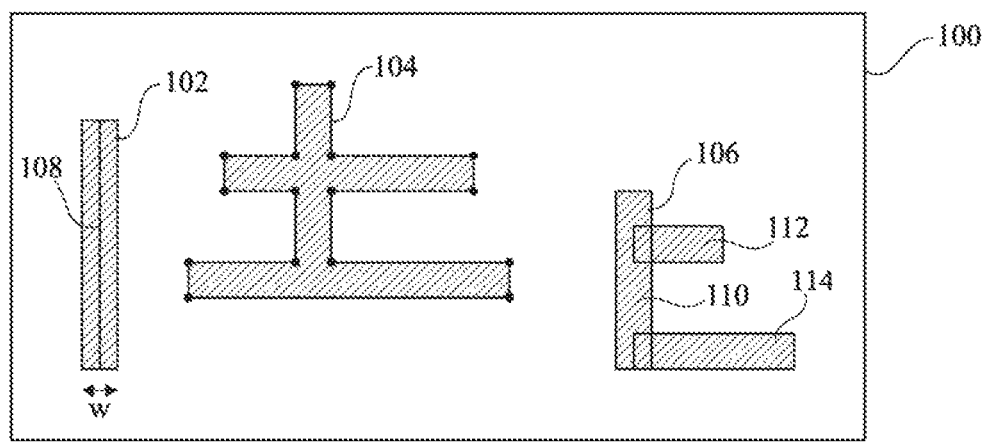
FIG. 1 illustrates an example of a geometric design represented by a geometric design file according to an example embodiment.

FIG. 1 illustrates an example of a geometric design 100 represented by a geometric design file according to an example embodiment. The example of FIG. 1 corresponds to a layout of a circuit of a microelectronic device, in which shaded zones correspond to zones in which metal is present. The design is thus a single layer design.

The design 100 comprises elements 102, 104 and 106. The description of these elements is for example stored in a file in a vectorial format, such as using the GDS II format, the OASIS format or another file format.

Each of the elements 102, 104 and 106 for example corresponds to a polygon that may be defined in any one of a number of different manners. For example, the element 102 is defined by a line 108 of a given length and having a certain thickness w. The element 104 is for example defined by a series of interconnected lines defining its perimeter, the intersections between the lines corresponding to corners. The element 106 is for example defined by three rectangular forms 110, 112 and 114, which may overlap, although in a single layer design such an overlap can be ignored.

As mentioned in the background section above, it may be desirable to compare the design 100 with another design to check whether there are any differences. One solution for comparing two design files could be to generate a checksum or the like for each electronic file, and to compare these checksums. However, a difference between the checksums would not indicate that there is necessarily a substantive difference between the geometric designs represented by the file.

A solution for making a substantive comparison between the designs could be to compare the position of the features of the two designs, point for point, element by element. However, such a technique would be very time-consuming for large and complex geometric files. Furthermore, it would require the two files that are being compared to be present. Thus, if a file is being transmitted to a third party, and the original sender wishes to be able to detect whether substantive changes have been made in a future version of the file, the original sender would need to conserve a copy of the original file, leading to the use of memory resources.

As will be described in more detail below, to address these issues, the present inventors have developed a method of generating a digital signature representing substantive elements of a geometric design file.

Figure 2:
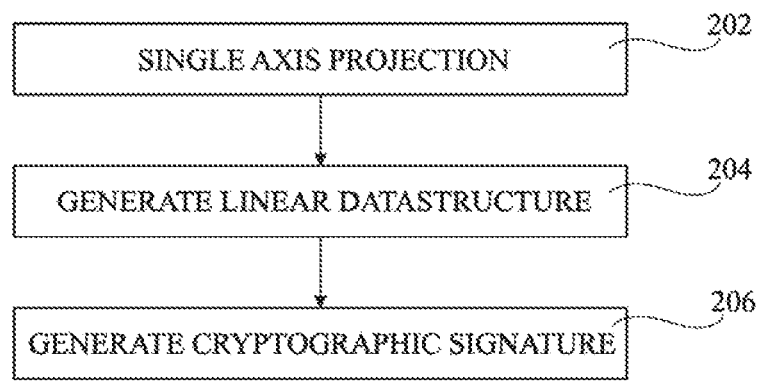
FIG. 2 is a flow diagram illustrating operations in a method of generating a digital signature of a geometric design according to an example embodiment of the present disclosure.

FIG. 2 is a flow diagram illustrating operations in a method of generating a digital signature of a geometric design file according to an example embodiment.

In an operation 202, the geometric design defined by the geometric design file is projected onto a single axis.

In an operation 204, a linear data structure is generated based on the single axis projection generated in operation 202.

In an operation 206, a digital signature is generated based on the linear data structure. For example, the digital signature is a cryptographic signature generated by a HASH function or the like. In one example, the MD5 (Message Digest 5) HASH function could be used, or the HASH function known as SHA-3 (Secure Hash Algorithm 3). The digital signature for example has a length of between 10 and several hundred bytes.

The digital signature generated in operation 206 is for example stored to a memory, and in some embodiments is added to the geometric design file.

Figure 3:
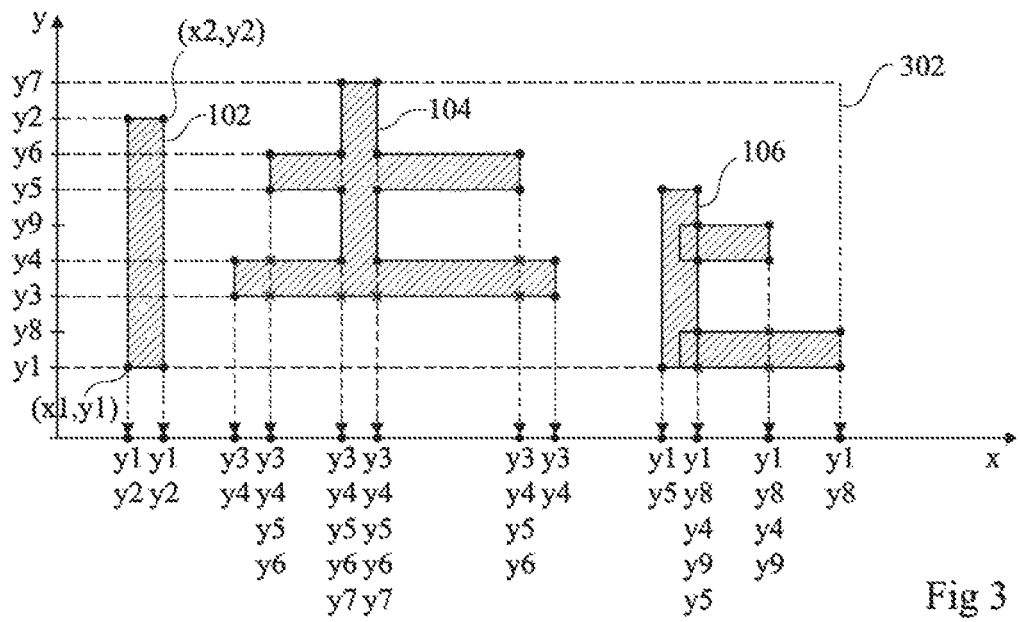
FIG. 3 is a graph representing a single axis projection operation of the method of FIG. 2 in more detail according to an example embodiment.

FIG. 3 is a graph representing an example of a single axis projection performed by the operation 202 of FIG. 2 applied to the geometric design file 100 of FIG. 1. In the example of FIG. 3, the projection is onto the x-axis, but of course in alternative embodiments the projection could be onto the y-axis.

Initially, a rectangular window 302 is for example defined having edges corresponding to the limits of the geometric design in the x and y directions. This window 302 then defines the region that is to be projected to a single axis.

Vertices of each element within the window 302 are then projected onto the x-axis. The vertices correspond to the corner points, formed by the intersection of each straight edge of each element of the design. For example, the element 102 is represented by its four corner points, having coordinates clockwise from bottom left to bottom right: (x1,y1), (x1,y2), (x2,y2) and (x2,y1). After single axis projection onto the x-axis, the y coordinates are for example positioned along the x-axis in an order based on the corresponding x coordinate of each vertex. The projection for the element 102 thus becomes (y1, y2, y1, y2). In this example, the y coordinates associated with each x coordinate are ordered from lowest to highest. Of course, in alternative embodiments, it would be possible to fix the order of the y coordinates in the opposite manner from highest to lowest.

In the case of the element 104, there are 16 vertices that are projected onto the x-axis. Furthermore, some of these vertices have an x coordinate crossed by edges of the element. These points are marked by crosses in FIG. 3, and in some embodiments, in addition to projecting the vertices to the x-axis, these points are also projected.

In the case of the element 106, it will be noted that the corners of the rectangles that overlap other rectangles are not for example considered as vertices of the element, and are thus ignored.

Figure 4:
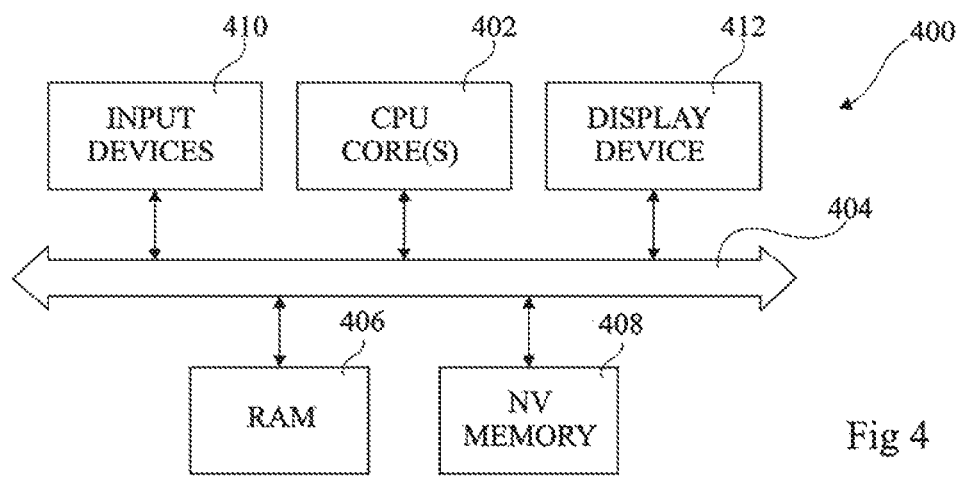
FIG. 4 schematically illustrates a computing device for generating a digital signature of a geometric design according to an example embodiment of the present disclosure.

FIG. 4 schematically illustrates a computing device 400 suitable for implementing the method described above in relation with FIGS. 2 and 3. The computing device 400 for example comprises a data processing device 402, comprising for example one or more CPU (Central Processing Unit) cores (CPU CORE(S)) under control of computing instructions. For example, the data processing device 402 is coupled via a bus 404 to a RAM (random access memory) 406 and to a non-volatile memory (NV MEMORY) 408, either or both of which may store instructions for controlling the data processing device 402. The memory 406 and/or memory 408 also for example stores one or more geometric design files and one or more digital signatures associated with each geometric design file. The computing device 400 also for example comprises one or more input devices (INPUT DEVICES) 410 and a display device (DISPLAY DEVICE) 412 coupled to the bus 404.

While in the example of FIG. 3 the geometric design comprises a single window 302, in alternative embodiments, the geometric design may comprise, or may be divided into, a plurality of windows which can be processed in parallel, as will now be described in more detail with reference to FIG. 5.

Figure 5:
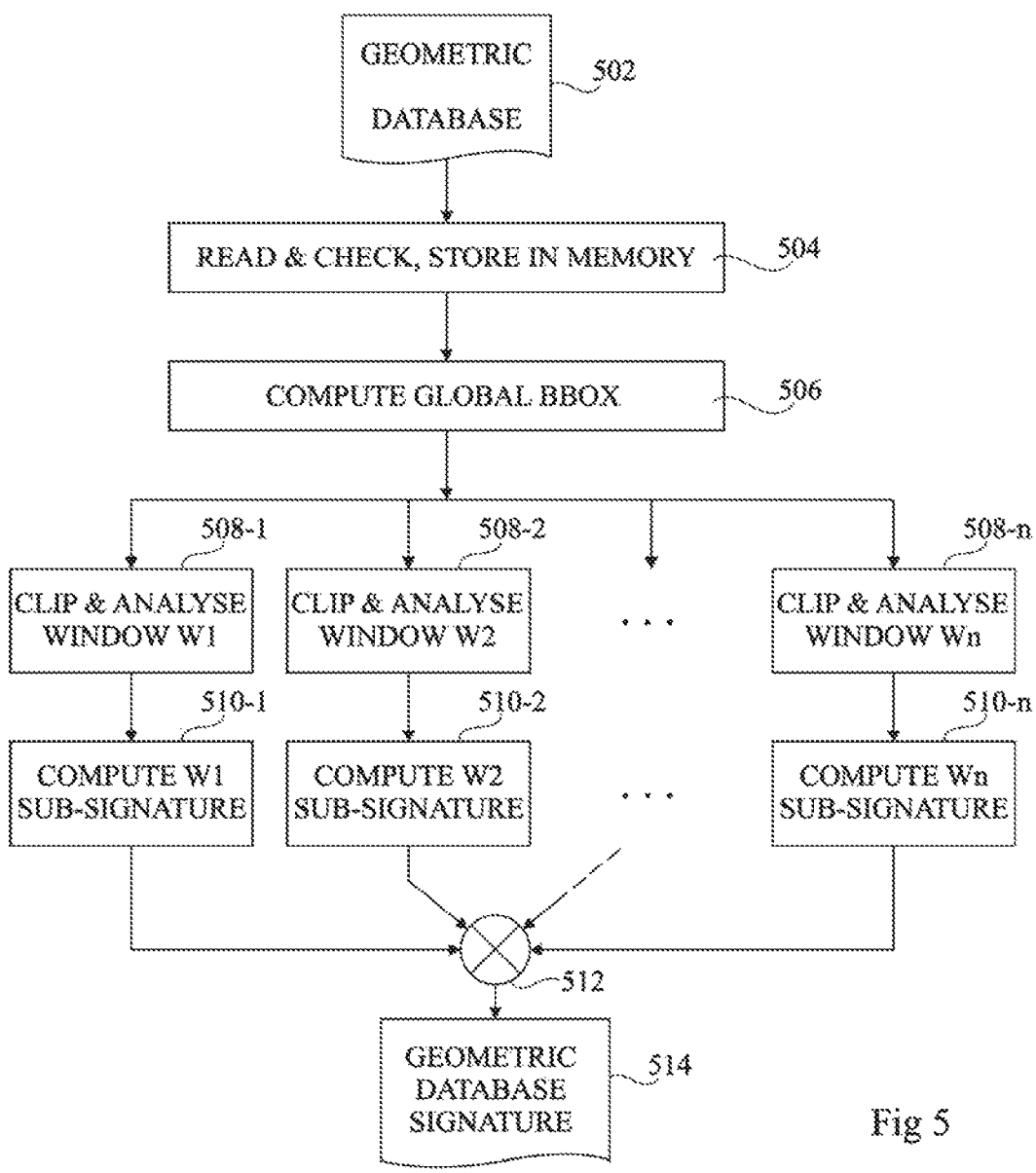
FIG. 5 is a flow diagram representing operations in a method of generating a digital signature for a geometric database according to an example embodiment of the present disclosure.

FIG. 5 is a flow diagram representing operations in a method of generating a digital signature of a geometric database (GEOMETRIC DATABASE) 502. The method is for example implemented by the computing device 400 of FIG. 4.

A geometric database as defined herein corresponds to one or more geometric designs that can be expressed by a plurality of windows. For example, a geometric database may comprise several geometric files, each having one or more windows, or a single geometric file having multiple layers, each layer having one or more windows.

In an operation 504, the geometric database 502 is for example read, checked to ensure that the files are uncorrupted, and stored in a memory, such as the RAM 406, of the computing device 400.

In an operation 506, a global BBOX (Boundary Box) is for example computed for the geometric database. As known by those skilled in the art, a BBOX is a boundary box that defines the size of the design by englobing all of the elements of the design. In some embodiments, the BBOX is defined as part of each geometric file of the geometric database.

Parallel processing of n windows W1 to Wn of the geometric database 502 is then for example performed at least partially in parallel, where n is for example equal to at least 2. For example, the geometric database may comprise a 2-dimensional design, which can be divided by the data processing device 402 into columns and rows of windows, each window for example covering an equal area of the design. Alternatively, other divisions of the design into windows would be possible. In some cases, the design may already be divided into sheets, views, layers or areas that can be processed as corresponding to one or more windows.

The parallel processing for example comprises parallel operations 508-1 to 508-$n$ and 510-1 to 510-$n$ performed on the n windows W1 to Wn respectively. Each of the operations 508-1 to 508-$n$ for example involves clipping and analysing the corresponding window W1 to Wn. Clipping the window for example involves defining the rectangle 302 of FIG. 3 based on the elements present within the window. Analysis of the window for example involves selecting, automatically or by a user, the geometries that are relevant to the computation of the signature. For example, a geometric database may comprise several layers or data types. The analysis operation for example involves selecting which layers and/or data types are to be considered for the signature computation. The operations 510-1 to 510-$n$ for example involve generating a sub-signature for each window W1 to Wn respectively, using the method described above with reference to FIG. 2.

The sub-signatures generated for each window W1 to Wn are then for example combined in an operation 512 in order to generate a geometric database signature (GEOMETRIC DATABASE SIGNATURE) 514. For example, the sub-signatures may each be of fixed length, and combining the signatures may simply involve concatenating the signatures in order to generate a database signature that is n times longer than the fixed length of each sub-signature. More complex data structures can also be used to represent the sub-signatures, such as hash trees.

The digital signature of a file or database described above is for example incorporated into the corresponding geometric file or database. A user receiving this file or database can extract this signature, and also recalculate a new signature for the file or database. By comparing the recalculated signature with the extracted signature, a verification can be performed as to whether any changes to the file have been made.

Alternatively, in order to compare two geometric files or databases, a signature is for example calculated for each file or database, and the signatures are compared in order to detect any difference.

A method of comparing signatures to detect differences between geometric files will now be described in more detail with reference to FIG. 6.

Figure 6:
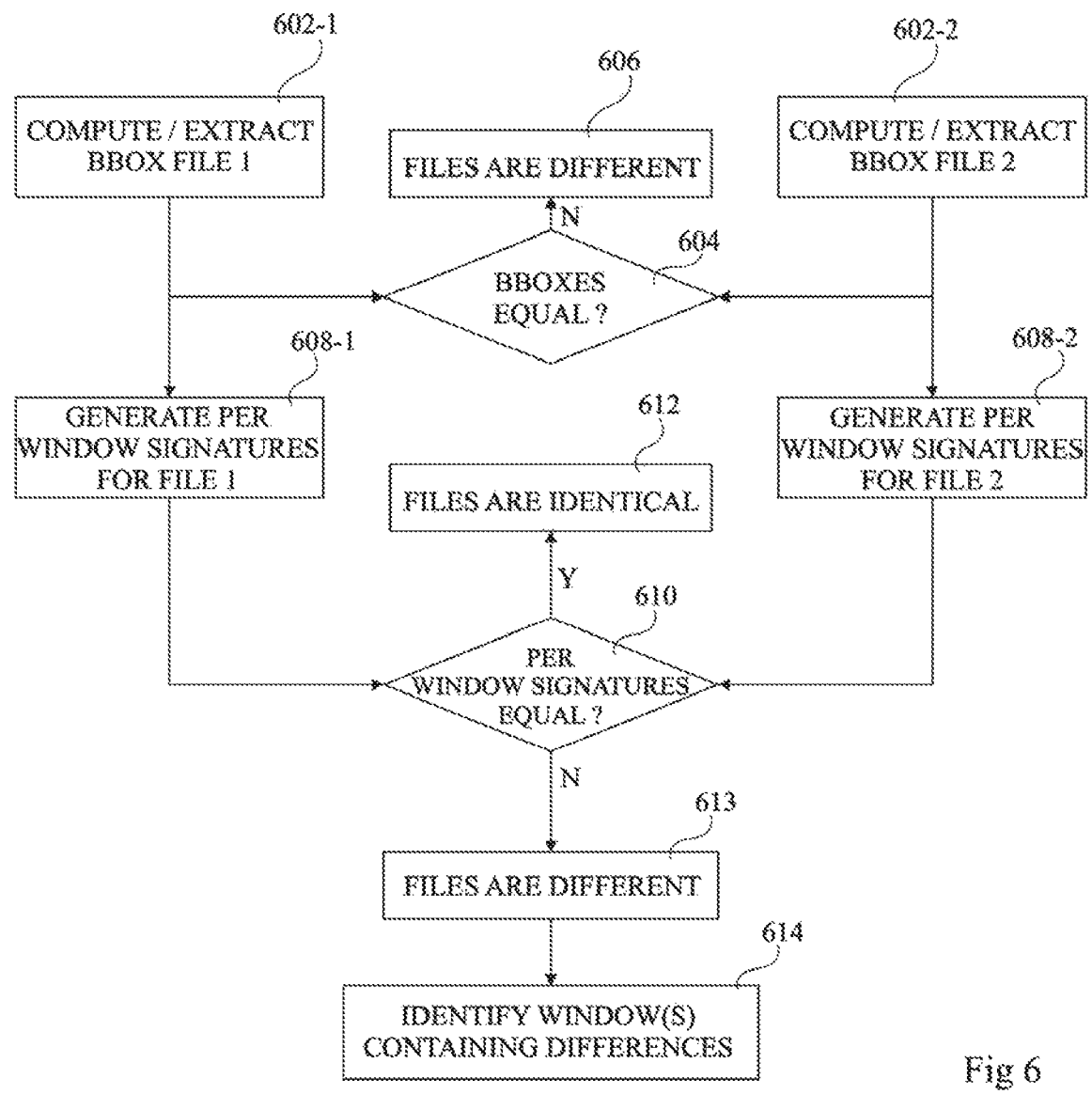
FIG. 6 is a flow diagram representing operations in a method of comparing geometric design files according to an example embodiment of the present disclosure.

FIG. 6 is a flow diagram representing operations in a method of comparing geometric files FILE 1 and FILE 2 according to an example embodiment of the present disclosure. This method is for example implemented by the computing device 400 of FIG. 4. The same process may be used for comparing geometric databases.

In parallel operations 602-1 and 602-2, BBOXES of the files FILE 1 and FILE 2 are respectively computed or extracted. For example, the BBOX may be stored within the file and extracted, or may be computed based on the design represented in the file.

In an operation 604, the BBOXES of the files FILE 1 and FILE 2 are compared. If they are not equal, this for example provides a rapid indication that the files are different, as represented by an operation 606. A user may be informed of the difference by an appropriate message displayed on the display device 412. Otherwise, parallel processing of the files continues.

In parallel operations 608-1 and 608-2, per window signatures for the files FILE 1 and FILE 2 are for example generated, and signatures of the corresponding windows in each file are compared one by one in an operation 610. If all of the signatures are found to be equal, the files are for example deemed to be identical in an operation 612, and the user may be informed of this result via the display device 412. Alternatively, if one or more of the signatures are found to be different, in an operation 613, the user is for example informed of this result via the display device 412. In some cases, directly a pair of signatures is found to be different, processing stops and the window found to be different in each file is for example indicated to the user in an operation 614. Alternatively, all signatures are generated and compared, and the user is informed of all windows found to be different in each file in the operation 614.

The example of FIG. 6 involves generating the per window signatures for each file in the operations 608-1 and 608-2 respectively. However, the per window signatures for either or both of the files could have already been calculated previously. For example, the per window signatures of the file FILE 2 may be contained within the file FILE 1. Indeed, the file FILE 2 for example corresponds to a prior version of FILE 1, based on which these per window signatures were generated.

In some embodiments, a geometric design file or database may have a hierarchical structure that can be exploited during the signature generation process, as will now be described with reference to FIGS. 7, 8 and 9.

Figure 7:
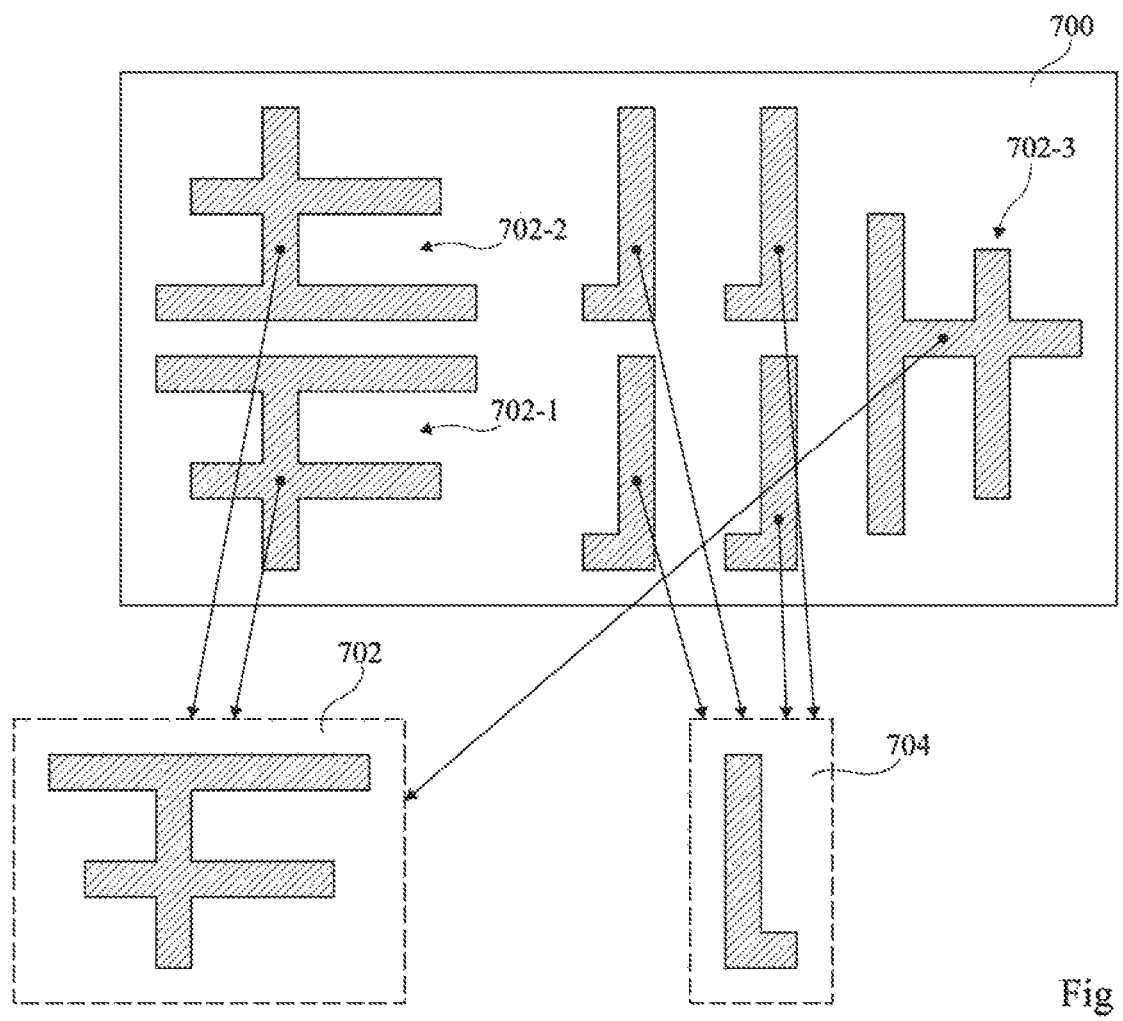
FIG. 7 represents a geometric design having a hierarchical structure according to an example embodiment.

FIG. 7 represents an example of a geometric design 700 having a hierarchical structure. A hierarchical structure implies that the design is formed of various instantiations of common elements. Each common element is for example defined once in the geometric design file, and the coordinates of each instantiation are for example indicated. Furthermore, each instantiation may correspond to a translation, rotation, magnification, reflection, etc. of the common element, and this information is also indicated for each instantiation.

For example, in FIG. 7, the hierarchical geometric design 700 comprises three instantiations of a common element 702, of which an instantiation 702-1 is identical to the common element 702, an instantiation 702-2 corresponds to a vertical reflection of the common element 702, and an instantiation 702-3 corresponds to both a rotation and reflection of the common element 702. The hierarchical geometric design 700 also for example comprises four instantiations of a common element 704, each of which is for example a horizontal reflection of this element.

Figure 8:
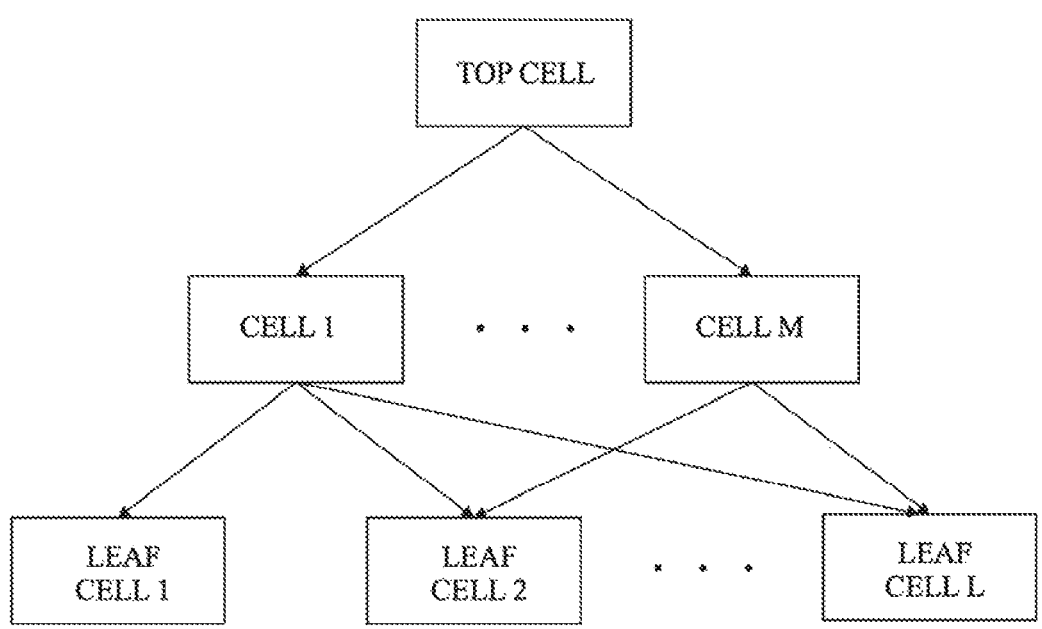
FIG. 8 is a graph representing a hierarchical design structure according to an example embodiment.

FIG. 8 is a graph representing cells in a hierarchical design structure. All cells of the design are for example part of a top cell (TOP CELL), which comprises M cells CELL 1 to CELL M. Each of the cells CELL 1 to CELL M for example comprises one or more elements corresponding to instantiations of one or more leaf cells, of which there are L in the example of FIG. 8, labelled LEAF CELL 1 to LEAF CELL L.

Figure 9:
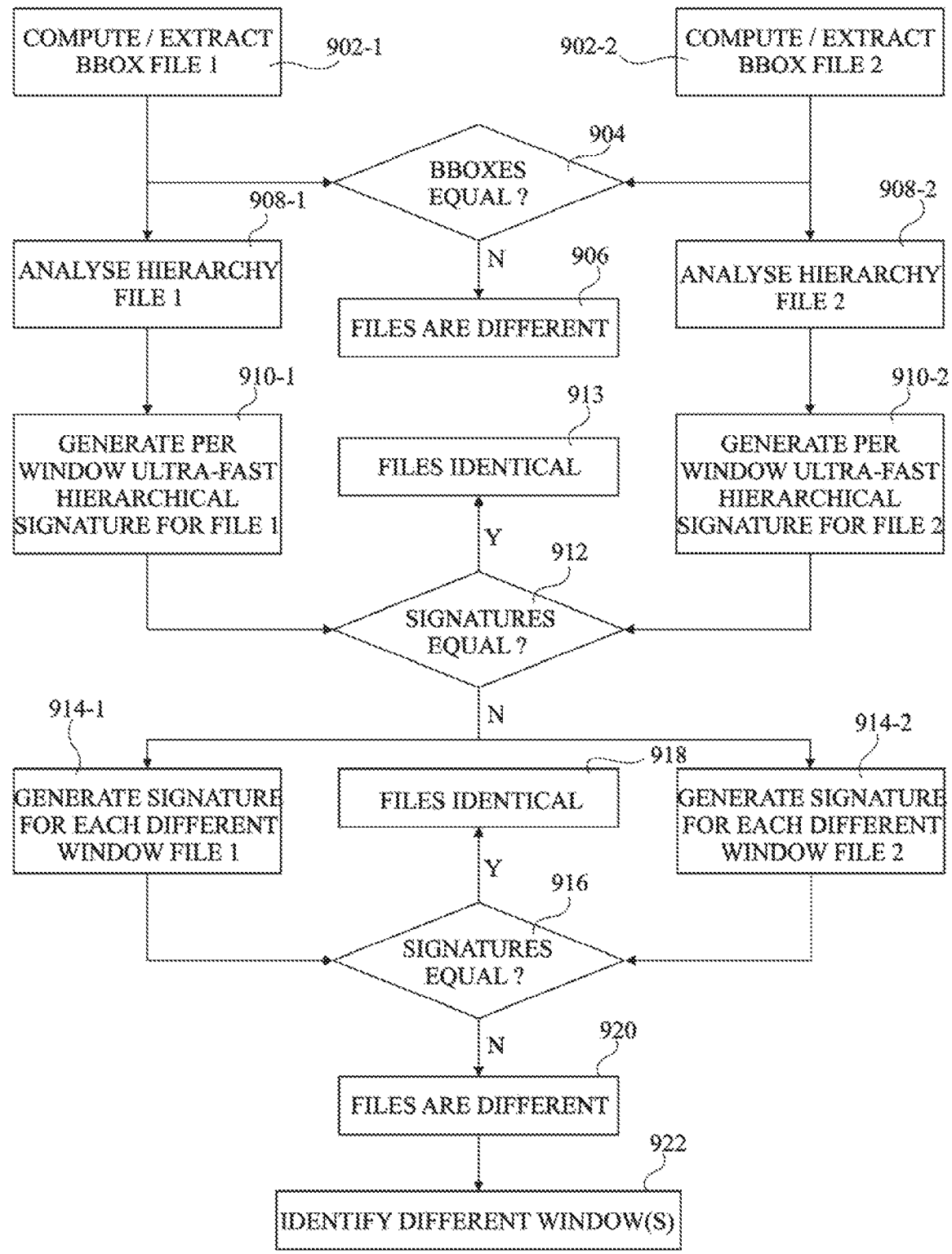
FIG. 9 is a flow diagram representing operations in a method of comparing geometric design files having hierarchical structures according to an example embodiment of the present disclosure.

FIG. 9 is a flow diagram representing operations in a method of comparing geometric design files FILE 1, FILE 2 having hierarchical structures according to an example embodiment of the present disclosure. This method is for example implemented by the computing device 400 of FIG. 4. The same process may be used for comparing geometric databases having hierarchical structures.

In parallel operations 902-1 and 902-2, BBOXES of the files FILE 1, FILE 2 are respectively computed or extracted. For example, the BBOX may be stored within the file, or may be computed based on the design represented in the file.

In an operation 904, the BBOXES of the files FILE 1, FILE 2 are compared. If they are not equal, this for example provides a rapid indication that the files are different, as represented by an operation 906. A user may be informed of the difference by an appropriate message displayed on the display device 412. Otherwise, parallel processing of the files continues.

In parallel operations 908-1 and 908-2, the processing device 402 for example identifies that the files FILE 1, FILE 2 have a hierarchical structure, and analyses the hierarchy in each file to identify a hierarchy of common design elements each having one or more instantiations.

In parallel operations 910-1, 910-2, a per window hierarchical signature is for example generated for each file FILE 1, FILE 2 respectively. This signature can for example be generated rapidly in comparison to a signature generated without exploiting the hierarchical file structure, and thus the signatures are designated in operations 910-1 and 910-2 as ultra-fast hierarchical signatures. The generation of each signature for example involves generating an elemental signature for each common design element, and then, for each instantiation of the common design element, generating a signature based on the elemental signature and on an indication of the manner in which the element is instantiated, including for example the position, rotation (if any), symmetry (if any), magnification (if any), etc. For example, in the case of the instantiation 702-1 of FIG. 7, its signature is for example equal to the elemental signature generated for the element 702 along with x and y coordinates indicating where the element 702 is instantiated. In the case of the instantiation 702-2, the elemental signature is used, along with an indication of the x and y coordinates of the instantiation, and an indication of the reflection that has been applied.

In an operation 912, the per window hierarchical signatures generated in operations 910-1 and 910-2 are compared one by one. If all of the signatures are found to be equal, the files are for example deemed to be identical in an operation 913, and the user may be informed of this result via the display device 412. Alternatively, if one or more of the signatures are found to be different, the method proceeds with parallel operations 914-1 to 914-2. Indeed, such a difference may result from a difference in the way in which the hierarchical structures of the two files are defined, rather than from a substantive difference between the designs.

In the parallel operations 914-1 and 914-2, per window signatures for the files FILE 1 and FILE 2 are for example generated without taking into account the hierarchical structure, and signatures of the corresponding windows in each file are compared one by one in an operation 916. If all of the signatures are found to be equal, the files are for example deemed to be identical in an operation 918, and the user may be informed of this result via the display device 412. Alternatively, if one or more of the signatures are found to be different, the files are for example deemed to be different in an operation 920, and the user is for example informed of this result via the display device 412. In some cases, directly a pair of signatures is found to be different, processing stops and the window found to be different in each file is for example indicated to the user in an operation 922. Alternatively, all signatures are generated and compared, and the user is informed of all windows found to be different in each file in the operation 922. The example of FIG. 9 involves generating the per window hierarchical signatures in the operations 910-1 and 910-2, and per window signatures in the operations 914-1 and 914-2. However, the hierarchical and non-hierarchical per window signatures for either or both of the files could have already been calculated previously.

An advantage of the embodiments described herein is that, by generating a digital signature of a geometric design file based on a single axis projection of the geometric design, the signature is able to provide an effective but condensed indication of the substance of the design. Thus, by comparing two signatures, substantive differences between the associated geometric designs can be identified in a rapid manner. Advantageously, the storage of the digital signature uses relatively little memory, particularly in the case that the signature has been further condensed by use of a HASH function.

Having thus described at least one illustrative embodiment, various alterations, modifications and improvements will readily occur to those skilled in the art. For example, while embodiments have been described in which a digital signature is based on a single axis projection of vertices of each design element of a design, in alternative embodiments, other points could additionally or alternatively be projected, such as points halfway along each edge. Furthermore, it will be apparent to those skilled in the art that the various design elements may be linked together, and that while an example of a single layer design has been provided, the method could be applied to multi-layer designs. It will be apparent to those skilled in the art that the various features described in relation with the various embodiments could be combined, in alternative embodiments, in any combination.

The invention claimed is:

1. A method of generating a digital signature for at least one geometric design represented by a geometric design file for each geometric design, the method comprising:
generating, by a data processing device, the digital signature based on a single axis projection for each geometric design, wherein generating the digital signature for each geometric design comprises performing, by the data processing device, the single axis projection to generate a vector comprising single axis coordinates of selected points for each geometric design; and
comparing a first digital signature with a second digital signature.

2. The method of claim 1, wherein generating the digital signature further comprises applying, by the data processing device, a HASH function to said vector in order to reduce its length.

3. A method of detecting, by a data processing device, differences between a first geometric design defined by a first geometric design file and a second geometric design defined by a second geometric design file, the method comprising:
generating, by a data processing device, for at least the first geometric design file, a first digital signature based on a single axis projection of the first geometric design; and
comparing the first digital signature with a second digital signature associated with the second geometric design file.

4. The method of claim 3, wherein generating the first digital signature comprises performing, by the data processing device, the single axis projection to generate a vector comprising single axis coordinates of selected points in the first geometric design.

5. The method of claim 3, wherein generating the first digital signature further comprises applying, by the data processing device, a HASH function to said vector in order to reduce its length.

6. The method of claim 3, further comprising, prior to said comparing: generating, for the second geometric design file, the second digital signature based on a single axis project of the second geometric design.

7. The method of claim 3, further comprising, prior to said comparing: extracting, by the data processing device, the second digital signature from the second geometric design file.

8. The method of claim 3, wherein generating the first digital signature comprises:
dividing, by the data processing device, the first geometric design into a plurality of windows;
generating a first sub-signature for each of said windows, wherein each first sub-signature is generated based on a single axis projection of the portion of the geometric design contained within the corresponding window; and
combining the first sub-signatures of said windows to generate said first digital signature.

9. The method of claim 3, further comprising:
generating, or extracting from the first geometric design file, a first boundary box associated with the first geometric design;
comparing said first boundary box with a second boundary box associated with the second geometric design; and
detecting a difference between the first and second geometric design files by detecting a difference between the first and second boundary boxes.

10. The method of claim 3, wherein generating the first digital signature comprises:
identifying, by the data processing device, a hierarchy of common design elements each having one or more instantiations within said first geometric design file;
generating an elemental signature for each common design element identified in said first geometric design file; and
generating said first digital signature based on each of said elemental signatures and on one or more characteristics of the instantiation of each of the common design elements in the first geometric design file.

11. A non-transitory electronic storage medium storing a computer program comprising instructions for executing the method of claim 3 when executed by said data processing device.

12. A computing device comprising:
a memory storing a first geometric design file defining a first geometric design;
a memory storing a second geometric design file defining a second geometric design; and
a data processing device configured to:
generate a first digital signature for the first design file by performing a single axis projection of the first geometric design;
generate a second digital signature for the second design file by performing a single axis projection of the second geometric design;
store the first and second digital signatures to a memory; and
detect differences between the first geometric design and the second geometric design by comparing the first digital signature with a second digital signature associated with the second geometric design file, and to display on a display device an indication of the detected difference.

* * * * *